April 26, 1938.   H. E. LIPPERT   2,115,510
STOKER STRUCTURE
Filed April 11, 1933   5 Sheets-Sheet 1

INVENTOR.
Henry E. Lippert
BY
E. Archer Turner
ATTORNEY.

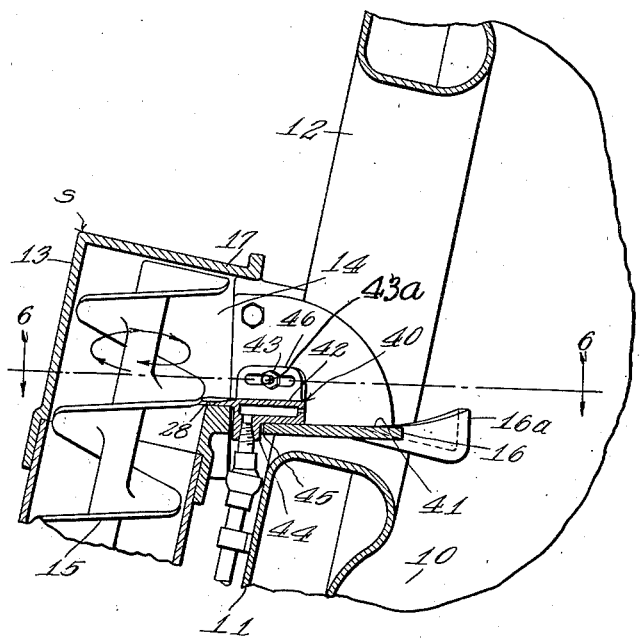
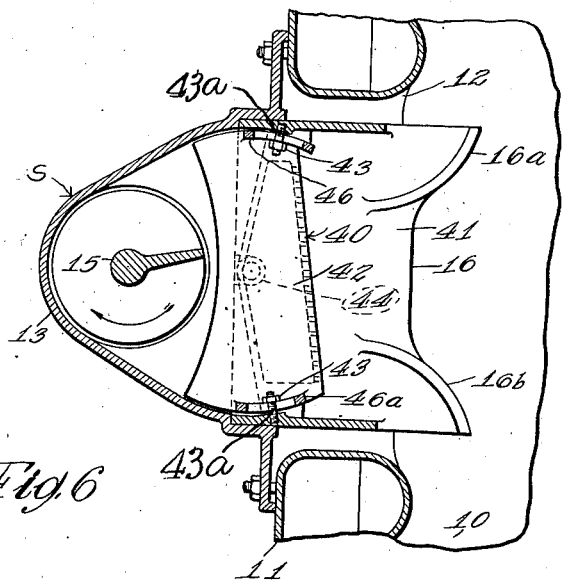

April 26, 1938.  H. E. LIPPERT  2,115,510
STOKER STRUCTURE
Filed April 11, 1933  5 Sheets-Sheet 3
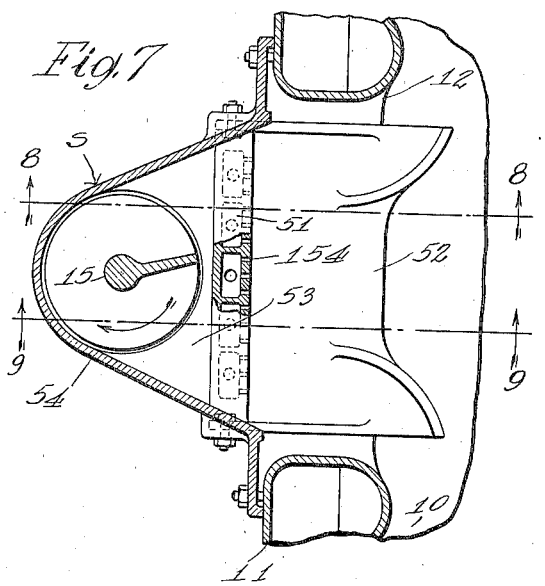
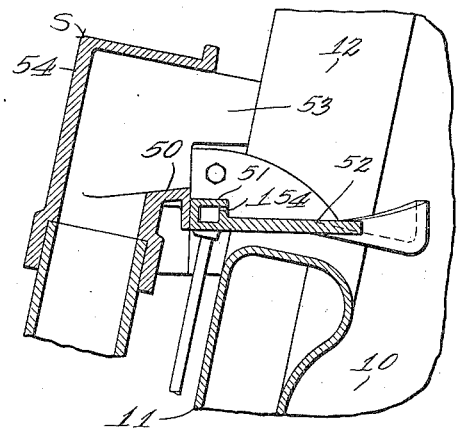
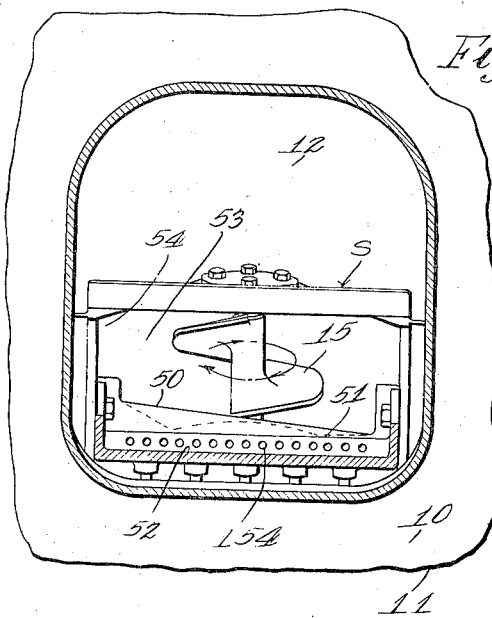
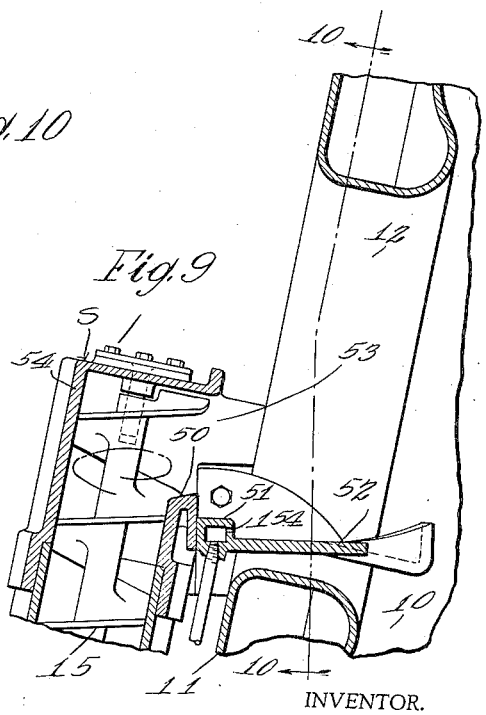
INVENTOR.
Henry E. Lippert
BY
E. Archer Turner
ATTORNEY.

April 26, 1938.  H. E. LIPPERT  2,115,510
STOKER STRUCTURE
Filed April 11, 1933  5 Sheets-Sheet 4
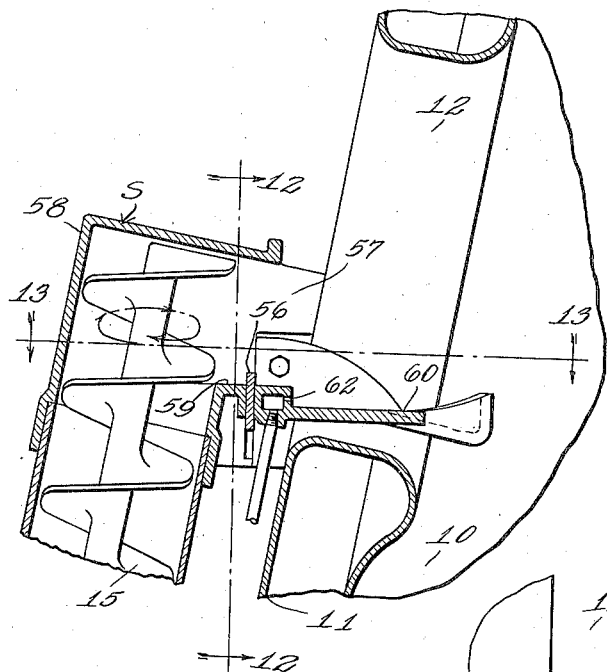
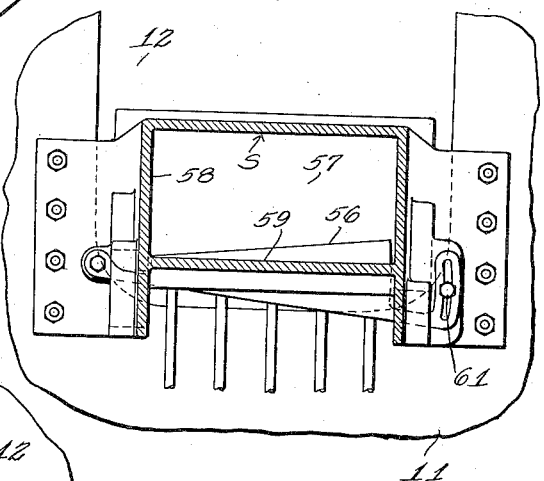
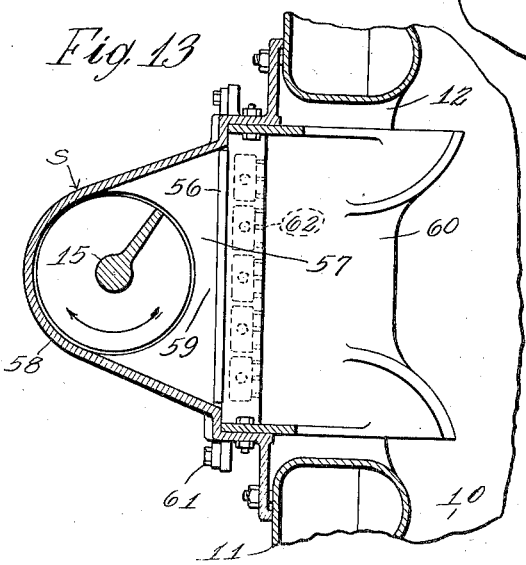
INVENTOR.
Henry E. Lippert
BY
E. Archer Turner
ATTORNEY.

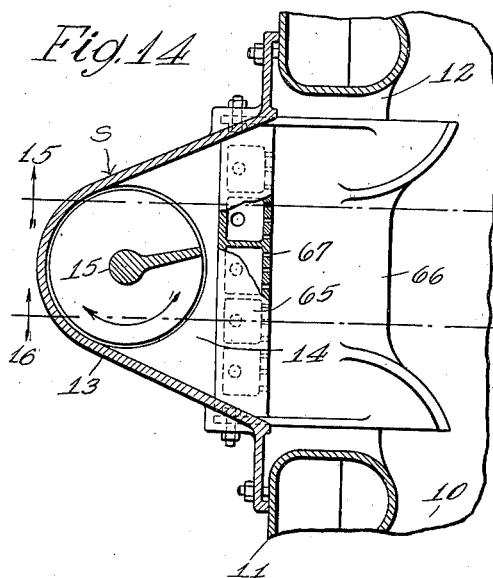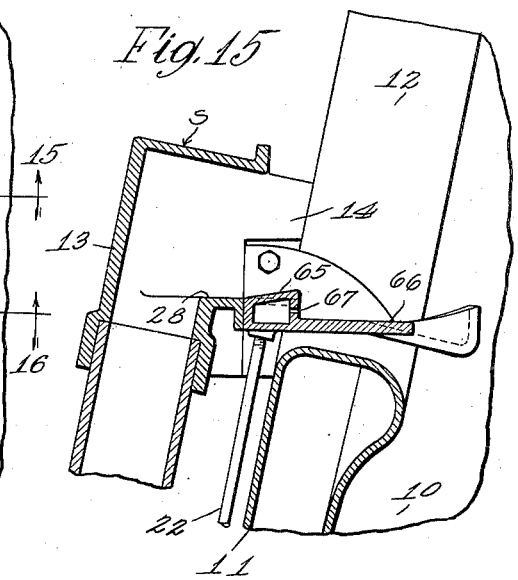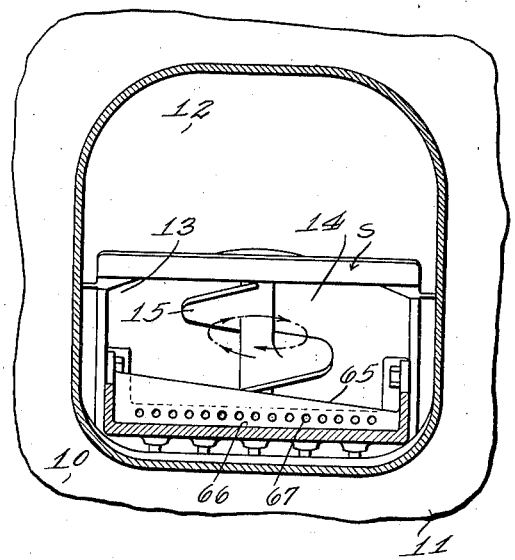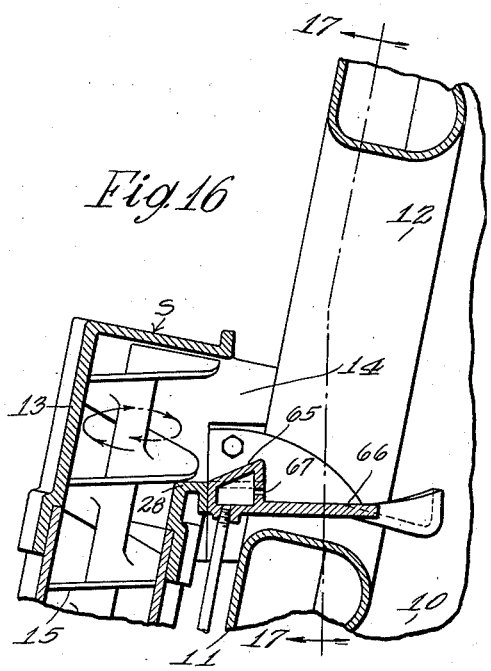

Patented Apr. 26, 1938

2,115,510

UNITED STATES PATENT OFFICE 2,115,510

STOKER STRUCTURE

Henry E. Lippert, Norfolk, Va., assignor, by mesne assignments, to The Standard Stoker Company, Inc., New York, N. Y., a corporation of Delaware Application April 11, 1933, Serial No. 665,483

12 Claims. (Cl. 110—101)

This invention relates to stokers for locomotives and like devices of the type which employs a screw conveyor for advancing the fuel to a means for spreading it over the fire. In stokers of this class, it is well known that the screw conveyor due to its helicoid vane and because of centrifugal force discharges more fuel to one side of its axis than the other and therefore, it delivers fuel unevenly to the receiving table of the means for distributing the fuel over the fire. Consequently, the fuel is spread unevenly over the fire resulting in troublesome firebed conditions. Heretofore, it has been customary to compensate for the uneven discharge of fuel by mounting an adjustable deflector member or a plurality of such members adjacent the delivery end of the conveyor. In some instances, the deflector members are undesirable because they obstruct space needed for hand firing or for access to the firebox.

This invention is directed to and has for its main object the provision of a compact, cheaply constructed means in the form of a receiving table or its equivalent for effecting even and uniform delivery of fuel from the screw conveyor to the fuel propelling means.

Specific objects of the invention reside in the particular construction of the receiving table and its associated parts and in their arrangement and relation with one another as illustrated on the accompanying drawings, in which, Figure 1 is a vertical central sectional view of a portion of the backwall of a locomotive firebox and a stoker communicating with the firing opening therein embodying the present improvement;

Figure 5 is a vertical central sectional view similar to Figure 1 showing another modification of the invention;

Figure 6 is a horizontal section taken on line 6—6 of Figure 5;

Figure 7 is a horizontal sectional view of a stoker and the back-wall of a locomotive firebox taken through the firing opening in the backwall illustrating another modified form of the invention;

Figure 1:
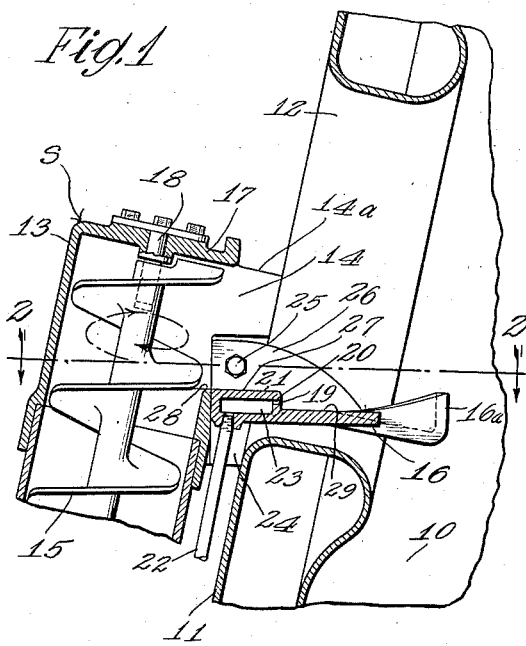

Figures 8 and 9 are vertical sections taken on lines 8—8 and 9—9 respectively of Figure 7;

Figure 10 is a vertical transverse section taken on line 10—10 of Figure 9 looking in the fuel outlet end of the stoker conduit;

Figure 11 is a vertical central sectional view similar to Figure 1 illustrating still another modified form of the invention;

Figure 12 is a vertical transverse section taken on line 12—12 of Figure 11;

Figure 13 is a horizontal section taken on line 13—13 of Figure 11;

Figure 14 is a horizontal sectional view of a stoker with a part thereof broken away and the backwall of a locomotive taken through the firing opening in the backwall and illustrates a further modified form of the invention;

Figures 15 and 16 are vertical sections taken on lines 15—15 and 16—16 respectively, of Figure 14; and Figure 17 is a vertical transverse section taken on line 17—17 of Figure 16, looking toward the fuel outlet end of the stoker conduit.

Figure 2:
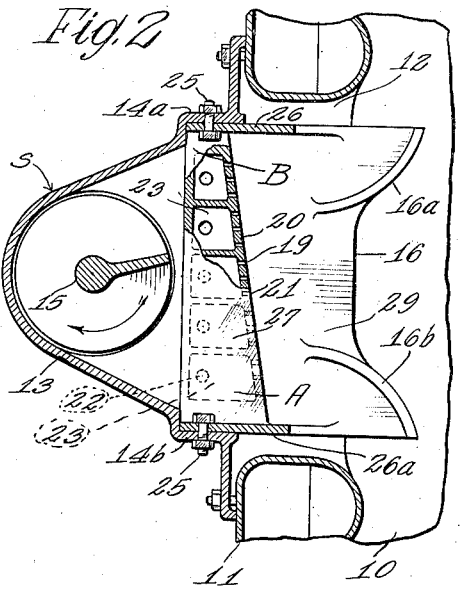
Figure 2 is a horizontal section taken on line 2—2 of Figure 1 with parts broken away.

As indicated by the drawings, the invention may be embodied in several different forms each of which will serve to carry out its main purpose. The preferred form is shown in Figures 1 and 2. Referring to these figures, 10 represents a firebox having an upright wall 11 provided with a firing opening 12 through which fuel is delivered into the firebox by a stoker S, only enough of which is disclosed to illustrate the present invention.

The stoker includes an upright feed or elevator conduit 13 disposed exteriorly of the firebox and positioned centrally on the vertical median line of the firing opening. Similarly, the discharge outlet of the mouth portion 14 of the conduit 13 is positioned substantially equally on either side of the vertical median line of the firing opening with which the discharge outlets communicate. It will be understood this relation of the conduit and its discharge outlet is the same in all embodiments of the invention illustrated. A screw conveyor 15 rotatably mounted in the elevator conduit advances the fuel upwardly therein and discharges the same laterally in the mouth portion 14 toward the firing opening 12 in the vicinity of which the fuel is delivered onto the horizontally disposed receiving table 16 extending toward the firebox from the conduit. The upper end of the screw may terminate in or about the plane of the receiving table, but as shown, it terminates above the table and directly beneath the top wall 17 of the conduit in which wall a journal 18 is mounted to support the screw. Any suitable drive mechanism may be employed for imparting continuous or intermittent rotary motion to the screw.

Fuel advanced onto the receiving table 16 is projected therefrom into the firebox by pressure fluid discharged from the jet openings 19 in the upright face 20 of the chambered portion or distributor head 21 of the table. This head is formed integral with the table but it may be made separable therefrom if desired. Pressure fluid is supplied to the jet openings through a plurality of pipes 22 opening into the chambers 23 of the head which chambers communicate with the jet openings. Deflecting ribs 16a, 16b, may be employed with the table to cooperate with the pressure fluid to spread the fuel evenly over the firebed. The receiving table is mounted in the throat 24 of the conduit mouth portion 14 and is secured in position by bolts 25 passing through its side flanges 26, 26a and the sidewalls 14a, 14b of the mouth portion 14.

In effect the top face 27 of the head portion 21 of the table 16 constitutes a horizontal fuel receiving floor for the conduit mouth portion 14 extending inwardly toward the firebox from the ledge 28 which forms the lower marginal edge of the fuel discharge outlet or aperture. Fuel is discharged by the screw 15 over the ledge 28 into the conduit mouth portion 14 onto the floor 27 of the receiving table. From this floor the fuel is urged inwardly toward the firebox by the pressure of the advancing stream of fuel over the face 19 onto the inward floor portion 29 of the table and within the zone of action of the pressure fluid discharging from the jet openings 19 which fluid serves to project the fuel into the firebox.

It will be observed that the conduit 13 below its mouth portion 14 is cylindrical and that the mouth portion flares laterally an equal distance on each side of the vertical median line of the firing opening. Thus, the fuel delivered by the screw will spread laterally in the mouth portion across the floor 27 as it advances thereover. With the screw rotating in the direction indicated by the arrows, more fuel will be delivered to the side portion A of the floor 27 than to the side portion B. This would result in more fuel being spread over one side of the firebox than the other. This condition is overcome by the important feature of the invention here consisting in making the side portion A of the floor 27 wider than the side portion B. The face 20 of the head portion of the table may extend somewhat diagonally across the table straight as shown, or it may be curved or made in any irregular shape such that will function the same as the structure disclosed. Hence, with this floor formation the fuel discharged to the side portion A of the floor 27 moves a greater distance before it passes into the zone of action of the pressure fluid blast than the fuel discharged to the side portion B and thus the side A of the floor 27 offers greater resistance to the passing of fuel than the side portion B. This causes the fuel to be delivered in uniform quantities across the width of the forward portion of the receiving table within the path of the pressure fluid. The same principle is embodied in one way or another in the modifications of the invention now to be described.

Figure 3:
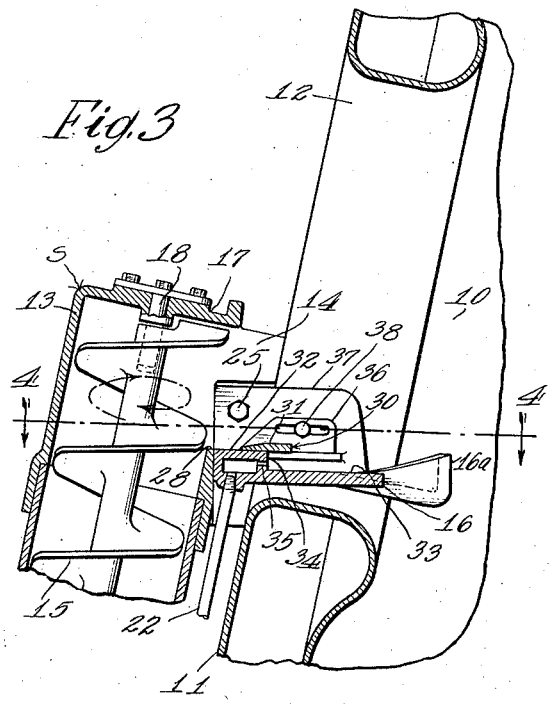
Figure 3 is a vertical central sectional view similar to Figure 1 illustrating a modified form of the invention.
Figure 4:
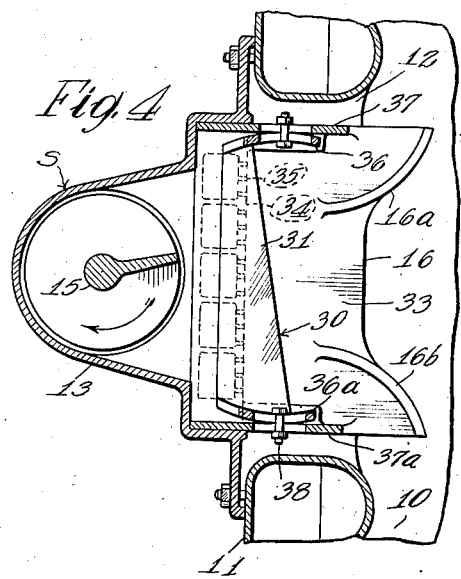
Figure 4 is a horizontal section taken on the line 4—4 of Figure 3.

Figures 3 and 4 illustrate a modification of the invention very similar to the preferred construction. The difference resides in the provision in the modified construction of an adjustable floor member 30 having a plate-like portion 31 disposed in a horizontal position immediately above the floor 32 of the receiving table 33 and arranged to extend inwardly toward the firebox a greater distance beyond the upstanding face 34 and the jet openings 35 therein on one side of the vertical median line of the firing opening 12 than on the other. This member 30 is provided with upstanding arcuate sidewalls 36, 36a disposed closely adjacent the side flanges 37, 37a of the receiving table to which flanges or arcuate sidewalls may be secured in any one of a number of positions by the use of bolts 38 passing through elongated slots in the arcuate sidewalls and the aforesaid flanges. By loosening the bolts 38, the member 30 can be adjusted to vary the distance on either side of the median line of the firing opening that the fuel must pass before passing into the zone of action of the pressure fluid blast discharged from the jet openings 35 to which the pressure fluid may be supplied as in the preferred form of the invention. In this modified construction, the member 30 may be termed in effect a horizontally disposed plate-like extension of the floor 32. The operation of the device illustrated in this modification of the invention is the same as in the preferred construction.

In the embodiment of the invention illustrated in Figures 5 and 6 the distance the fuel must travel on either side of the vertical side of the median line of the firing opening before it is discharged from the fuel conveyor 15 is determined by adjustment of the distributor head 40 which is made separable from the forward portion of the receiving table 41. The floor 42 of the distributor head constitutes the rearward portion of the receiving table. The head may be placed in any one of a number of positions by loosening the nuts 43, which are threaded over studs 43a, and moving the head 40 about the pivot-like extension 44 which passes through an aperture 45 in the outward end portion of the receiving table. By drawing up the nuts 43 along studs 43a and against the distributor head sidewalls 46, 46a, the head may be secured in any desired position.

Figures 7, 8, 9 and 10 respectively, represent still another embodiment of the invention. In this construction like in the preferred form of the invention, the elevator screw 15 discharges more fuel to one side of the vertical median line of the firing opening than to the other. This uneven delivery of the fuel is overcome in this particular construction by employing the same principle of the preferred construction, but carrying it out in a somewhat different manner. To provide greater distance of travel and more frictional resistance to the fuel on one side of the vertical median line of the firing opening than the other, the discharge ledge 50 is inclined from a point adjacent the floor 51 of the receiving table 52 across the mouth portion 53 of the elevator conduit 54. Thus, in this construction like in all others heretofore described the fuel on that side of the vertical median line to which more of the fuel is discharged by the elevator screw must travel a greater distance and be subjected to more frictional resistance before it passes into the zone of action of the pressure fluid discharging from the jet openings 154 than the fuel delivered to the other side of the median line.

The important feature of the invention of causing the fuel to travel a greater distance on one side of the vertical median line of the firing opening than on the other before it reaches the zone of action of the distributing blast is carried out in the embodiment of the invention illustrated in Figures 11, 12 and 13 by mounting a vertically disposed adjustable plate 56 in the mouth portion 57 of the conduit 58 between the discharge ledge 59 and the receiving table 60. The plate 56 may be adjusted so that one side thereof is higher than the other with respect to the ledge 59 by loosening the bolt 61. It will be apparent from these figures without further description that the fuel on that side of the vertical median line to which more of the fuel is discharged by the screw than the other must travel a greater distance and be subjected to more frictional resistance before passing into the zone of action of the pressure fluid discharging from the jet openings 62 than the fuel discharged to the other side of the firing opening.

A similar embodiment of the invention is disclosed in Figures 14 to 17 inclusive. In these figures the top wall 65 of the receiving table 66 is inclined from one side of the table to the other and rearward of the pressure fluid discharged from the jet openings 67. The high side of the top wall is disposed on that side of the vertical median line of the firing opening to which the elevator screw 15 tends to discharge more of the fuel. Thus, it will be understood that the fuel on that side of the vertical median line of the firing opening to which more of the fuel is discharged must travel a greater distance and be subjected to more frictional resistance before passing into the path of the pressure fluid discharged from the jet opening 67 than the fuel delivered to the other side of the firing opening.

It will be understood, of course, that the various detail features of the modified forms of the invention not described at length may be of the same or similar construction as corresponding parts in the preferred construction.

As evidenced by the number of embodiments of the invention illustrated, it may be utilized to accomplish the main object of the invention in many different ways such as are contemplated within the scope of the appended claims.

I claim:

1. In combination with a firebox having an upright wall provided with a firing opening, a stoker elevator conduit mounted exteriorly of the firebox in communication at its upper end with said opening, a fuel conveyor screw within said conduit terminating adjacent the upper end thereof, said conveyor screw arranged with its axis disposed in a median vertical plane passing through said firing opening, fuel distributing means including a horizontally disposed plate extending into the firing opening and a distributor head between said screw and said plate having a front face provided with a horizontal row of jet openings arranged to discharge blasts of pressure fluid, the front face of said distributor head having an edge above said jet openings over which edge the fuel discharged from said screw falls onto said plate, the portion of said edge at one side of the vertical axial plane of said conveyor screw being nearer to the axis of said conveyor screw than the portion of said edge at the opposite side of the aforesaid vertical axial plane.

2. In combination with a firebox having an upright wall provided with a firing opening, a stoker elevator conduit mounted exteriorly of the firebox having a mouth portion at its upper end in communication with the firing opening, a fuel conveyor screw within said conduit terminating adjacent the upper end thereof, said conveyor screw arranged with its axis disposed in a median vertical plane passing through said firing opening, fuel distributing means including a horizontally disposed plate extending into the firing opening and a distributor head having a top wall forming a floor for said mouth portion, said distributor head being provided with a horizontal row of jet openings arranged to discharge blasts of pressure fluid forwardly over said plate, the top wall of said distributor head being arranged to provide a surface between said screw and said plate over which the fuel passes to said blasts the portion of said surface on one side of the vertical axial plane of said conveyor screw being of greater area than the portion of said surface on the other side of the aforesaid vertical axial plane.

3. In combination with a firebox having an upright wall provided with a firing opening, a stoker elevator conduit mounted exteriorly of the firebox in communication at its upper end with said opening, a fuel conveyor screw within said conduit terminating adjacent the upper end thereof, said conveyor screw arranged with its axis disposed in a median vertical plane passing through said firing opening, fuel distributing means including a horizontally disposed plate extending into the firing opening and a distributor head between said screw and said plate having a front face provided with a horizontal row of jet openings arranged to issue blasts of pressure fluid, a horizontally disposed plate-like member mounted immediately above said jet openings and extending over said plate, said member having a ledge over which the fuel discharged from said screw falls onto said plate, the ledge of said member being spaced a greater distance from the front face of said distributor head on one side of the vertical axial plane of said conveyor screw than on the other side of the aforesaid vertical axial plane.

4. In combination with a firebox having an upright wall provided with a firing opening, a stoker elevator conduit mounted exteriorly of the firebox in communication at its upper end with said opening, a fuel conveyor screw within said conduit terminating adjacent the upper end thereof, said conveyor screw arranged with its axis disposed in a median vertical plane passing through said firing opening, fuel distributing means including a horizontally disposed plate extending into the firing opening and a distributor head between said screw and said plate having a front face provided with a horizontal row of jet openings arranged to issue blasts of pressure fluid, a horizontally disposed plate-like member mounted for adjustment in a horizontal plane immediately above said jet openings, said member extending over said plate and having a ledge over which the fuel from said conduit falls onto said plate, the ledge of said member normally being spaced a greater distance from the front face of said distributor head on one side of the vertical axial plane of said conveyor screw than on the other side of the aforesaid vertical axial plane, and means for adjusting said horizontally disposed plate like member for varying said distance.

5. In combination with a firebox having an upright wall provided with a firing opening, a stoker elevator conduit mounted exteriorly of the firebox in communication at its upper end with said opening, a fuel conveyor screw within said conduit, said conveyor screw arranged with its axis disposed in a median vertical plane passing through said firing opening, fuel distributing means including a horizontally disposed plate extending into the firing opening and a distributor head between said screw and said plate having an upper surface and a front face provided with a horizontal row of jet openings arranged to issue blasts of pressure fluid, said screw terminating adjacent the upper end of said conduit and arranged to discharge fuel over the upper surface of said distributor head onto said plate, the upper surface of said distributor head at one side of the vertical axial plane of said conveyor screw being formed to provide a longer passage for fuel than the upper surface of said distributor head at the opposite side of the aforesaid vertical axial plane.

6. In combination with a firebox having an upright wall provided with a firing opening, a stoker elevator conduit mounted exteriorly of the firebox in communication at its upper end with said opening, fuel distributing means including a horizontally disposed plate extending into the firing opening and a distributor head between said conduit and said plate having a front face provided with a horizontal row of jet openings arranged to issue blasts of pressure fluid and a top surface across which fuel passes from said elevator conduit to said horizontally disposed plate, said distributor head being mounted for adjustment in horizontal plane whereby, upon adjustment thereof, the position of said front face with respect to a median vertical plane bisecting the firing opening will be varied.

7. In combination with a firebox having an upright wall provided with a firing opening, a stoker elevator conduit mounted exteriorly of the firebox in communication at its upper end with said opening, a fuel conveyor screw within said conduit, said conveyor screw arranged with its axis disposed in a median vertical plane passing through said firing opening, fuel distributing means including a horizontally disposed plate extending into the firing opening and a distributor head between said screw and said plate, said distributor head being provided with a horizontal row of jet openings arranged to issue blasts of pressure fluid, said screw terminating adjacent the upper end of said conduit and arranged to discharge fuel over said distributor head onto said plate, a vertically disposed plate-like member mounted intermediate said screw and said plate to extend into the path of the fuel and having a top edge formed to extend a greater distance above the top surface of said plate on one side of the vertical axial plane of said conveyor screw than on the other side of the aforesaid vertical axial plane.

8. In combination with a firebox having an upright wall provided with a firing opening, a stoker elevator conduit mounted exteriorly of the firebox in communication at its upper end with said opening, fuel distributing means including a horizontally disposed plate extending into the firing opening and a distributor head between said conduit and said plate provided with a horizontal row of jet openings arranged to issue blasts of pressure fluid, a vertically arranged plate-like member extending into the path of the fuel from said conduit to said plate and mounted between said conduit and said plate for adjustment in a median vertical plane passing through said conduit, said member being arranged with said distributing means whereby, upon adjustment of said member, the position of the top edge of said member with respect to the top surface of said plate will be inclined.

9. In combination with a firebox having an upright wall provided with a firing opening, an upwardly extending stoker conduit mounted exteriorly of the firebox, a fuel conveyor screw within said conduit terminating adjacent the upper end thereof, said conduit having a fuel delivery opening at its upper end adjacent the firing opening, said conveyor screw arranged with its axis disposed in a median vertical plane passing through said firing opening, fuel distributing means including a horizontally disposed plate portion in the firing opening and a pressure fluid distributor head between the lower marginal edge of said fuel delivery opening and said horizontally disposed plate portion, said distributor head having a vertically disposed front wall, said front wall being provided with jet openings arranged to emit blasts of pressure fluid across said plate portion and a spill edge above the level of said jet openings over which fuel discharged from said stoker conduit drops into the zone of action of the pressure fluid blast, the distance between said spill edge and the lower marginal edge of said fuel delivery opening increasing from a minimum on one side of the vertical axial plane of said conveyor screw to a maximum on the other side of the aforesaid vertical axial plane.

10. In combination with a firebox having an upright wall provided with a firing opening, an upwardly extending stoker conduit mounted exteriorly of the firebox, a fuel conveyor screw within said conduit terminating adjacent the upper end thereof, said conduit having a fuel delivery opening at its upper end adjacent the firing opening, said conveyor screw arranged with its axis disposed in a median vertical plane passing through said firing opening, fuel distributing means including a horizontally disposed plate in the firing opening and a pressure fluid distributor head between the lower marginal edge of said fuel delivery opening and said horizontally disposed plate, said distributor head having a top wall above the plane of said plate and a vertically disposed front wall, said front wall being provided with jet openings arranged to emit blasts of pressure fluid, the junction of the top and front walls of said pressure fluid distributor head forming a spill edge over which fuel drops on to said horizontal plate into the zone of action of said pressure fluid blasts, said top and front walls being arranged so that the distance between said spill edge and the lower marginal edge of said fuel delivery opening increases from a minimum on one side of the vertical axial plane of said conveyor screw to a maximum on the other isde of the aforesaid vertical axial plane.

11. In combination with a firebox having an upright wall provided with a firing opening, a stoker elevator conduit mounted exteriorly of the firebox in communication at its upper end with said firing opening, a conveyor screw for advancing fuel through said conduit, said conveyor screw arranged with its axis disposed in a median vertical plane passing through said firing opening, a distributor plate positioned approximately horizontally at said firing opening, a distributor head having an upstanding transverse wall at the rear portion of said plate provided with jet openings arranged to discharge pressure fluid blasts forwardly over the plate, and a floor above said jet openings extending between said plate and said conduit for receiving the fuel therefrom and supporting it until delivery onto said plate, the fuel supporting surface of said floor at one side of a vertical axial plane of said conveyor screw being formed to provide a longer passage for fuel than the fuel supporting surface of said floor at the opposite side of the aforesaid vertical axial plane.

12. In combination with a firebox having an upright wall provided with a firing opening, a stoker elevator conduit mounted exteriorly of the firebox in communication at its upper end with said firing opening, a conveyor screw for advancing fuel through said conduit, said conveyor screw arranged with its axis disposed in a median vertical plane passing through said firing opening, a distributor plate positioned approximately horizontally at said firing opening, a distributor head having an upstanding transverse wall at the rear portion of said plate provided with jet openings arranged to discharge pressure fluid blasts forwardly over the plate, and means interposed between said screw and that portion of the distributor plate adjacent said transverse wall to afford a longer effective passage for the fuel at one side of a vertical axial plane of said conveyor screw than at the opposite side of the aforesaid vertical axial plane.

HENRY E. LIPPERT.